G. Tibbits, Jr.
7915X
Cistern.
Patented Dec. 30. 1833.
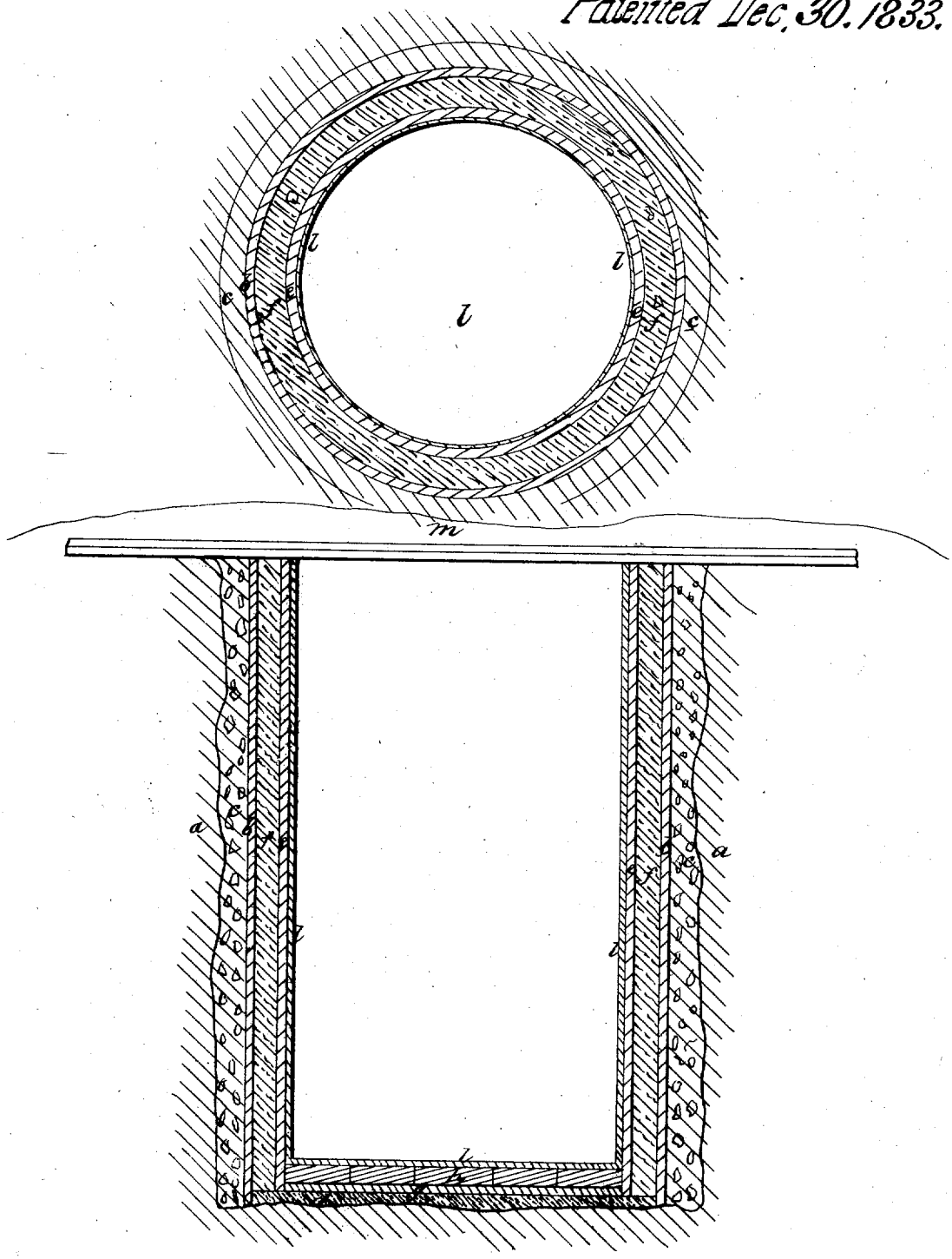
THE GRAPHIC CO. PHOTO-LITH. 39 & 41 PARK PLACE, N.Y.

12/30/1833 7915x

15

Dec 30 1833

37

George Tibbits, Junior.

Letters Patent.

The schedule referred to in these Letters Patent and making part of the same contain-
-ing a description in the words of the said George Tibbits Jun.r himself of his im-
provement in constructing Cisterns.

Having dug a circular pit of a suitable size, place within it near
the outside a tier of plank of any suitable length and thickness, beveled so that
when brought close together, they will form a circular tube, around the outside of
this tube the earth or some other hard substance should be packed even with the
top, upon the bottom of the pit around the inside of this tube, spread a stratum
of mortar, of water lime, and sand, upon which place another tier of plank
or boards prepared in like manner as the first, so as to form another tube with-
-in the first above mentioned of so much less size as to leave a space of from one
to two inches in width between them, this space is to be filled with grout (a
composition of water lime sand and water so thin as to run) or in places where
stone and water lime are plenty. This space may be from six to twelve inches
wide and filled with small stone or gravel and grouted) when the grout has
become sufficiently hard (which will require but a few minutes if the lime is good)
The inside and top of the last mentioned tube should be plastered with mortar of
the materials above mentioned, so as to cover all the wood and exclude from it the
air and water. The bottom of the pit should then be plastered with like
mortar, then covered with a stratum of stone or brick and grouted or plastered,
again with mortar of the materials aforesaid. This done the whole should be
covered so as to secure it from frost. The invention or improvement of which the
petitioner claims to be the author is the using two tubes and filling the space between
them with grout or stone or gravel & grout and excluding the air and water from
the inner tube, whereby it is preserved from decay and the effects of worms.

In witness whereof I the petitioner above named have hereunto set my
name this fifth day of December 1833.

Witness { [illegible]
{ [illegible]

George Tibbits Jun.r